Sept. 10, 1968  G. F. LUTZ  3,400,439
CUTTER HOLDERS
Filed Sept. 15, 1966

INVENTOR
GILBERT F. LUTZ
BY
ATTORNEYS

3,400,439
CUTTER HOLDERS

Gilbert F. Lutz, Chesterland, Ohio, assignor to The Warner & Swasey Company, Cleveland, Ohio, a corporation of Ohio
Filed Sept. 15, 1966, Ser. No. 579,583
13 Claims. (Cl. 29—96)

The present invention relates to tool holders for a machine tool and more particularly to holders for cutting tools in which the cutter may be supported in different positions.

It is an important object of the present invention to provide a new and improved tool holder for a machine tool in which the tool can be positioned so that the cutting portion of the tool extends above or below the holder and wherein the holder can be readily adjusted to support the tool when in either position along substantially the entire length of the cutter in the holder.

Another object of the invention is the provision of a new and improved cutter holder for a machine tool which can be adjusted to provide for each position of the tool an inclined bearing surface against which one side of a tool is adapted to bear for substantially the full length of the tool in the holder.

Still another object of the present invention is the provision of a new and improved cutter holder adapted to reversibly supported a tool of a machine tool and wherein a part having relatively inclined sides is positionable in the holder so that one of the inclined sides provides part of an inclined tool bearing surface of a first inclination and is repositionable in the holder to provide a tool bearing surface of a second inclination which is reversed with respect to the first inclination.

A further object of the present invention is the provision of a new and improved cutter holder for a machine tool having a head with relatively inclined surfaces and a part having relatively inclined sides, and wherein the part is supported on the head so that one of the sides thereof engages one of the surfaces of the head and the other side cooperates with the other surface of the head to define an inclined bearing surface against which the cutter is adapted to bear.

A still further object of the present invention is the provision of a new and improved cutter holder for a machine tool having a wedge-shaped member providing an inclined bearing surface against which the cutter is adapted to bear and which member is releasably connected to a part of the holder by a pin member which is inserted and locked in an opening in the part and may be readily removed from the opening.

Yet another object of the present invention is the provision of a new and improved cutter holder, as noted in the preceding paragraph, wherein the part of the holder has another pin receiving opening into which the pin member may be selectively inserted to reposition the wedge-shaped member on the part and in which position the bearing surface provided is reversed with respect to the inclination of the bearing surface provided when the pin member is in the other opening.

Further objects, advantages and novel characteristics of the invention will become apparent from the following detailed description of a preferred embodiment of the invention made with reference to the accompanying drawings and in which.

Figure 1:
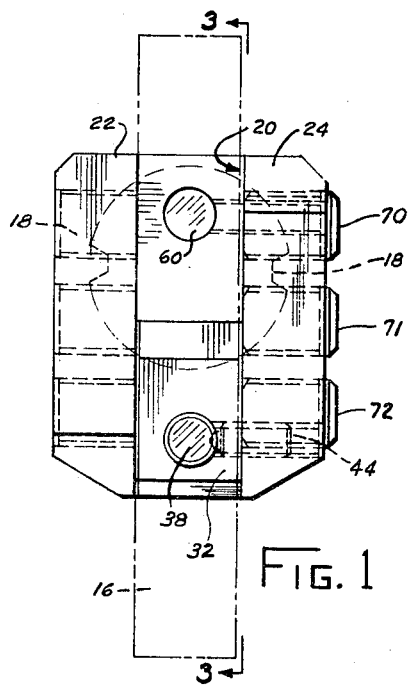
FIG. 1 is an end elevational view of the cutter holder embodying the present invention.

The present invention provides a new and improved cutter holder for supporting a cutting tool in inclined relationship in the holder. In the illustrated embodiment, the cutter is positioned in the holder to extend either downwardly or upwardly from the holder and in each position, the cutter is supported along substantially its entire length in the holder. The cutter is supported in earh position along an inclined bearing surface which provides a different inclination for each cutter position. The holder, according to the present invention, is applicable for supporting different implements or tools ultilized by a machine tool and is particularly applicable for supporting a cutting tool in a machine tool. Accordingly, the preferred embodiment of the cutter holder will be described as supporting a cutter of a machine tool which is adapted to perform a cutting operation on a relatively moving workpiece.

A preferred embodiment of the present invention is shown in the drawings as embodied in a cutter holder 10. The cutter holder 10 comprises a head 12 and a shank 14 extending from one side of the head 12. The head 12 is adapted to receive and support a turning cutter 16. The cutter 16 is clamped in the head 12 and the holder 10 is assembled in a multiple tool holder of the machine tool. The heat 12 and the shank 14 have axially extending keyways 18 on opposite sides thereof which receive locking keys therein when shank 14 is inserted into an opening provided therefor in the multiple tool holder.

Figure 2:
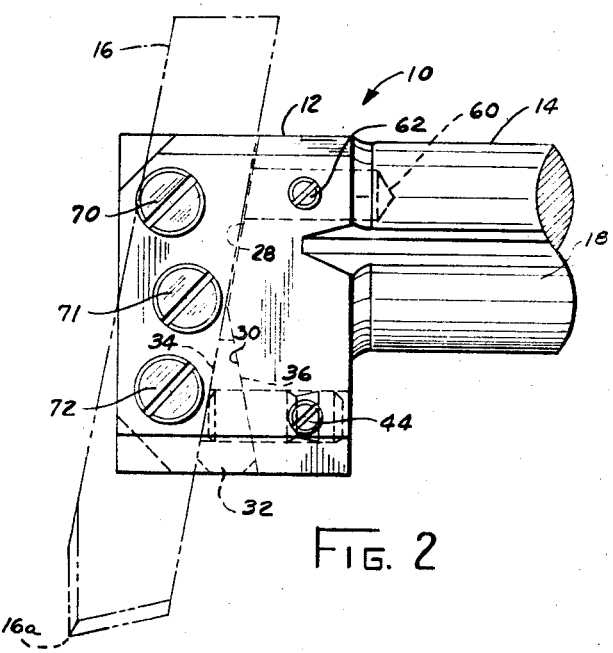
FIG. 2 is a side elevational view of the cutter holder of FIG. 1.
Figure 3:
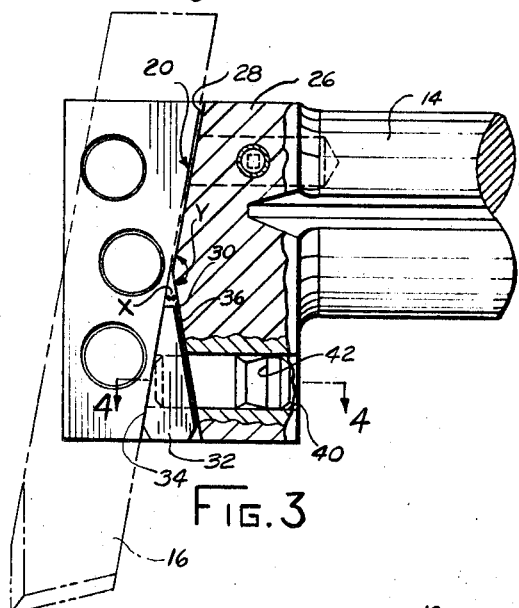
FIG. 3 is a sectional view of the cutter holder taken substantially along line 3—3 of FIG. 1.

The cutter 16 is positioned in a slot 20 provided in head 12. The slot 20 extends the full length along one side of the head 12 and is defined by spaced wall portions 22, 24 which project outwardly from one side of a body portion 26. The bottom side of slot 20 is formed by two surfaces 28 and 30 which extend inwardly from the upper and lower sides, respectively, of the body portion 26 and intersect at approximately midway of the length of the slot. Surface 28 defines the upper bottom side of slot 20 and determines the inclination of the cutter holder 16 when the cutter 16 is to be supported in a so-called normal position in the holder 10, shown in FIG. 2. When positioned in its normal position, the cutter 16 extends downwardly from the holder 10 with the cutting portion 16a below the lower side of the holder. In the normal position, the upper portion of the cutter 16 bears against the upper surface 28 and the lower cutter portion of the cutter 16 bears against a wedge-shaped member 32 which is positioned between the cutter 16 and the lower surface 30. The wedge-shaped member 32 has oppositely inclined sides 34 and 36 and when positioned as shown in FIG. 2, side 34 forms a continuation of the upper surface 28 so that the cutter is supported substantially along the entire length of the part of one side thereof which is received in the slot 20. The other side 36 of the wedge-shaped member 32 engages the lower surface 30 of the bottom side of the slot.

Figure 5:
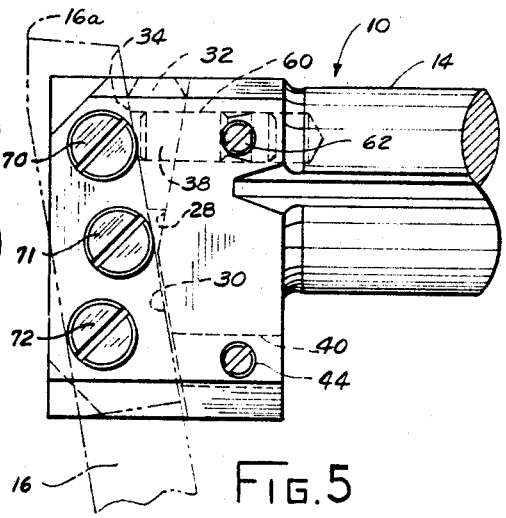
FIG. 5 is a side elevational view of the cutter holder similar to FIG. 2 but showing parts arranged in different operative positions.
Figure 4:
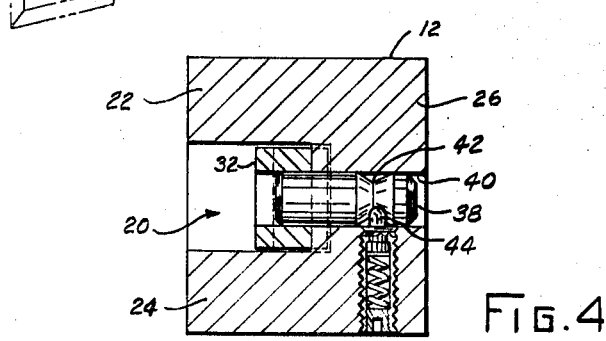
FIG. 4 is a sectional view of the holder taken substantially along line 4—4 of FIG. 3.

Lower surface 30 of the bottom side of the slot determines the inclination of the cutter 16 when the cutter 16 is to be positioned in a so-called reverse position in the holder, shown in FIG. 5, wherein the cutter extends upwardly from the holder with cutting portion 16a above the upper side of the holder 10. When in the reverse position, the wedge-shaped member 32 is positioned in the holder between the cutter 16 and the upper surface 28 so that side 34 of the wedge-shaped member 32 forms a continuation of the lower surface 30 and side 36 engages the upper surface 28 of the slot side.

The intersection of the planes of sides 34 and 36 of the wedge-shaped member 32 forms an angle X which is supplementary to an angle Y formed by the intersection of the upper and lower surfaces 28 and 30. This angular relationship provides a straight, substantially continuous inclined bearing surface extending substantially the entire length of the slot 20 for each position of the cutter 16 in the holder.

The wedge-shaped member 32 is releasably connected to body portion 26 by a pin 38. Pin 38 is preferably secured to member 32 and extends axially from side 36 and is received in pin receiving opening 40 in the lower part of the body portion 26 to provide for supporting the cutter in its normal position. Pin 40 has a recess 42 which is V-shaped in cross section and formed by intersecting beveled annular surfaces formed intermediate the ends of the pin. A spring plunger 44 in body portion 26 is biased into opening 40 and engages the recess 42 when pin 38 is inserted in opening 40 and holds the wedge-shaped member 32 on the body portion 26. The wedge-shaped member 32 is removed by pulling it away from body portion 26 so that the leading annular surface defining part of recess 42 cams the spring plunger 44 outwardly of opening 40 and the nose or forward portion of the pin 38 moves past the plunger.

The wedge-shaped member 32 may be repositioned in the holder 10 in the position shown in FIG. 5 to provide for supporting the cutter 16 in its reverse position by inserting pin 38 in an opening 60, similar to opening 40, in the upper part of body portion 26. A spring plunger 62, similar to plunger 44, is spring biased into aperture 60 and engages recess 42 in the pin 38 and holds the wedge-shaped member 32 in the new position. With the wedge-shaped member 32 positioned as shown in FIG. 5, the reversely inclined cutter bearing surface is provided.

The cutter 16 is clamped in the holder in each position by set screws 70, 71, and 72. When the cutter tool 16 is in its reverse position, it can perform cutting operations on parts of the workpiece which were inaccessible to the cutter in its normal position.

It should be apparent that the respective inclinations of the bearing surface are constant along their entire length. The bearing surfaces are provided in the illustrated embodiment by side 34 of wedge-shaped member 32 and surface 28 or 30 depending on which position the cutter is to assume in the holder. Alternatively, the entire back side of the slot 20 could be provided by an inclined surface of a wedge-shaped member which extends the entire length of slot 20. In such an arrangement, one pin receiving opening could be provided in body portion 26 midway of the length of slot 20. The inclination of the bearing surface could be changed by turning the wedge-shaped member 180° and reinserting the pin into the opening whereby the inclined side of the wedge-shaped member would be reversed.

From the foregoing, it should be apparent that a relatively simple and effective reversible cutter holder for supporting a cutter in oppositely inclined positions has been provided. In either position, the cutter is clamped against an inclined bearing surface and is held therein so as to withstand the force exerted thereon by the cutter during cutting operations without permitting detrimental movement of the cutter in the holder.

Although the preferred embodiment of the present invention has been described in considerable detail, it is intended to cover all modifications, adaptations, and changes which come within the scope of the appended claims.

Having described my invention, I claim:

1. A cutter holder for a machine tool having a tool receiving portion, said tool receiving portion having means for supporting a tool in different inclinations in the holder including a part having a side providing a part of an inclined bearing surface for the cutter of a first inclination when arranged in a first position in the holder and providing part of an inclined bearing surface of a second inclination when arranged in a second position in the holder.

2. The cutter holder defined in claim 1, wherein said part has relatively inclined sides, one of said sides forming a portion of said inclined bearing surface and the other side engaging said tool receiving portion.

3. The cutter holder defined in claim 2, wherein said tool receiving portion has oppositely inclined surfaces, and said sides of said part being selectively cooperable with either of said inclined surfaces to define bearing surfaces of reverse inclinations.

4. The cutter holder defined in claim 1, including means for releasably supporting said part in said positions.

5. The cutter holder defined in claim 4, wherein said means for releasably supporting said part includes a pin carried by said part, a pair of pin receiving openings in said cutter receiving part and means cooperating with said pin and said openings to lock said pin in a selected one of said openings and releasable to permit the pin to be removed and inserted in the other of said openings.

6. A cutter holder for a machine tool comprising a head adapted to support a cutter, said head having surfaces inclined relative to one another, a member having sides inclined relative to one another and means supporting said member on said head so that one of said sides of said member abuts one of said surfaces of said head and the other side of said part cooperates with the other surface of said head to define an inclined bearing surface against which the cutter is adapted to bear when supported in the holder.

7. The cutter holder defined in claim 6, wherein said means supporting said member includes a pin extending from said one side of said part, a pin receiving opening in said one surface of said head and means cooperating with said pin and said opening to hold said pin in said head.

8. A cutter holder for a machine tool as defined in claim 6, wherein said means comprises a head adapted to support a cutter and a shank connected to said head, a wedge-shaped member having relatively inclined sides, including additional means to support said member in a second position to provide a bearing surface of a second inclination which is reversed with respect to said first inclination, said means including a pin connected to said wedge-shaped member, an opening in said head for receiving said pin and means operatively associated with said pin and said opening to releasably secure said pin in said opening.

9. A cuttter holder for a machine tool as defined in claim 6, wherein said head is a slotted head providing a cutter receiving slot having a bottom surface providing said oppositely inclined surfaces, said means being releasable to provide for connection of said wedge-shaped member to said head in a second position wherein one side of said member abuts the other inclined surface of said head and the other side of said member copperates with said one surface of said head to provide a bearing surface of a second inclination.

10. A cutter holder defined in claim 9, wherein each of said inclined surfaces of said head has a pin receiving opening therein and said wedge-shaped member has a pin projecting from one of said sides thereof and which is adapted to be selectively positioned in one of said openings and means for locking said pin in the selected opening to secure said wedge-shaped member to said head portion of said holder.

11. The cutter defined in claim 10, wherein said means for locking said pin includes a spring plunger associated with each opening, each of said plungers having an end disposed in the associated opening and engageable with a recessed portion of said pin to lock the pin in the selected opening.

12. The cutter holder defined in claim 9, further including means for clamping a cutter in said slot in said head.

13. A cutter holder for a machine tool comprising a head adapted to receive a cutter and having a pin receiving opening therein, a wedge-shaped member having sides inclined relative to one another and providing an inclined bearing surface against which the cutter is adapted to bear, pin means operatively connected to said wedge-shaped member and being positionable in said pin receiving opening, and means for holding said pin member in said opening and releasable to permit said pin to be removed from said opening.

References Cited

UNITED STATES PATENTS

| | | | |
|---|---|---|---|
| 1,716,762 | 6/1929 | Buxbaum | 29—96 |
| 1,720,820 | 7/1929 | Cole | 29—96 |
| 2,382,911 | 8/1945 | Pringle | 29—96 |
| 2,706,327 | 4/1955 | Bodin | 29—96 |
| 3,121,939 | 2/1964 | Williams | 29—96 |
| 3,324,528 | 7/1967 | Buchmann | 29—96 |

HARRISON L. HINSON, *Primary Examiner.*